M. J. FURLONG.
VEHICLE.
APPLICATION FILED MAY 9, 1921.
1,436,031.
Patented Nov. 21, 1922.
2 SHEETS—SHEET 1.
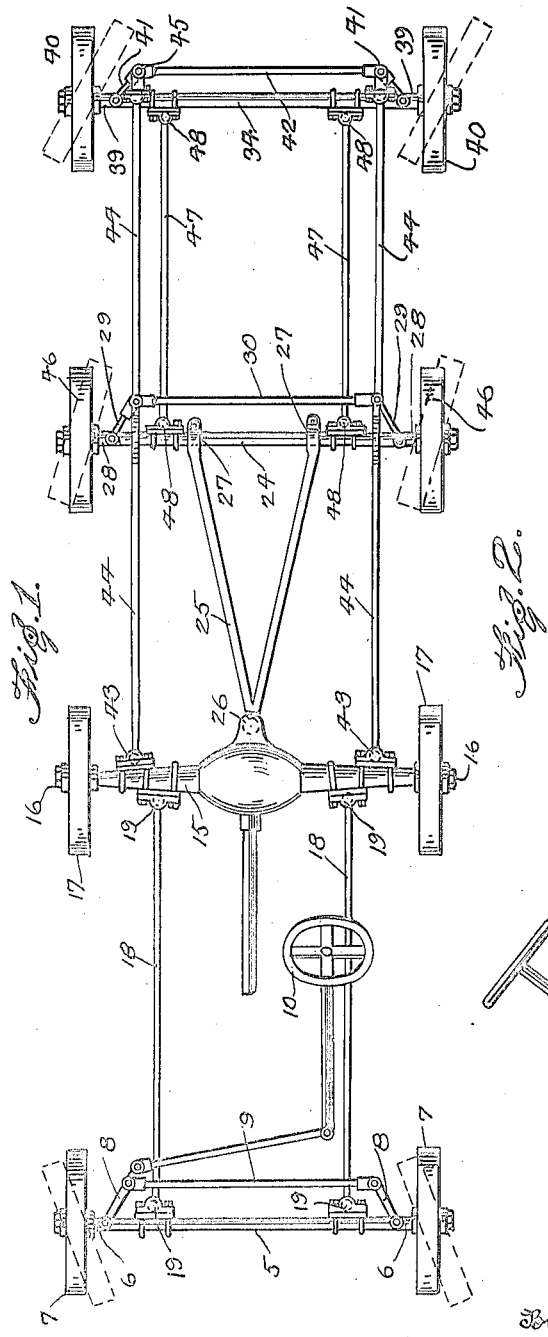
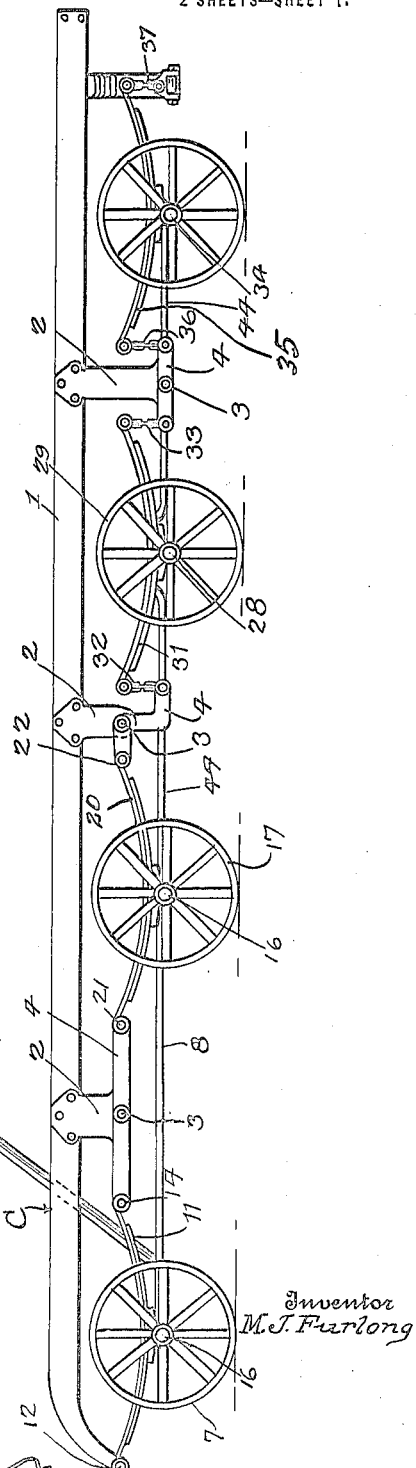
Inventor
M. J. Furlong
By Watson E. Coleman
Attorney

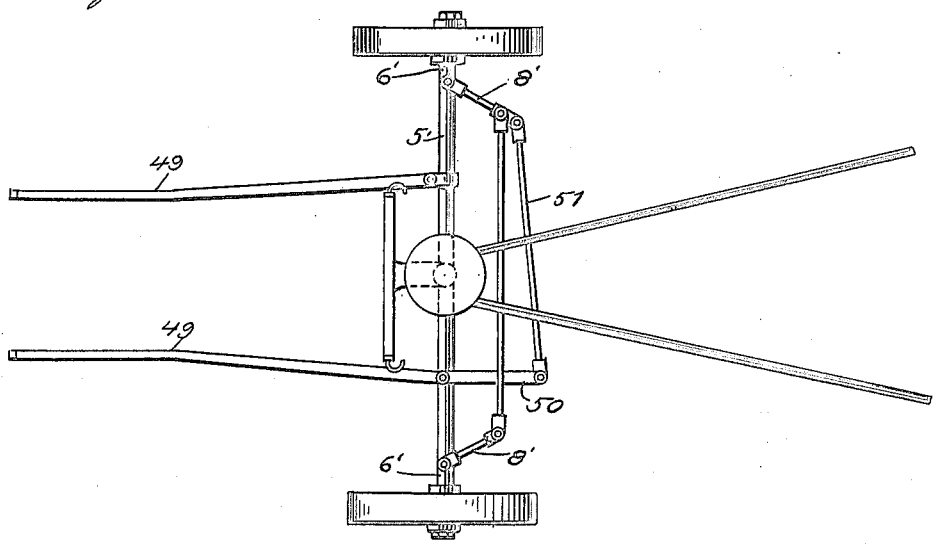
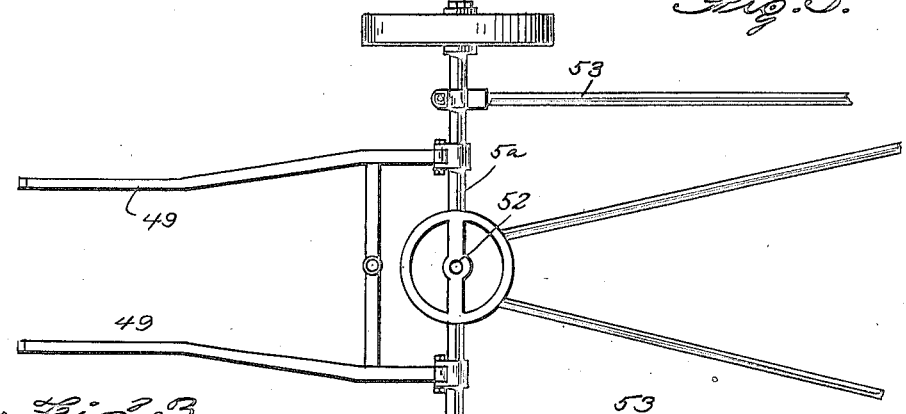
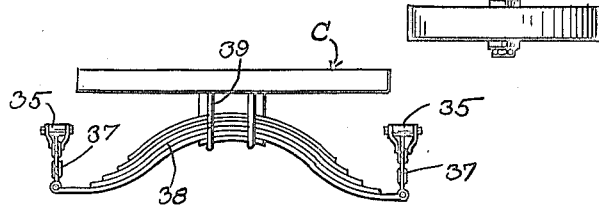

Patented Nov. 21, 1922.

1,436,031

UNITED STATES PATENT OFFICE.

MARTIN J. FURLONG, OF HOUSTON, TEXAS.

VEHICLE.

Application filed May 9, 1921. Serial No. 467,967.

*To all whom it may concern:*

Be it known that I, MARTIN J. FURLONG, a citizen of the United States, residing at Houston, in the county of Harris and State of Texas, have invented certain new and useful Improvements in Vehicles, of which the following is a specification, reference being had to the accompanying drawings.

This invention relates to certain improvements in vehicles and has relation more particularly to a special wheel base whereby a materially long body may be embodied in the vehicle to increase the capacity, and it is an object of the invention to provide a novel and improved structure whereby proper steering of the vehicle is facilitated.

Another object of the invention is to provide a device of this general character embodying a novel wheel base including three or more axles provided with ground engaging wheels, the wheels of certain of the axles being laterally movable in one direction and the wheels of other of the axles being laterally movable in an opposite direction to effect the desired steering travel of the vehicle.

An additional object of the invention is to provide a vehicle provided with a novel and improved wheel base embodying means whereby the rear portion of the vehicle is caused to travel laterally in a direction opposite to that in which the vehicle is being turned.

The invention consists in the details of construction and in the combination and arrangement of the several parts of my improved vehicle whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein;

Figure 1 is a view in top plan and of a somewhat diagrammatic character illustrating a special wheel base constructed in accordance with an embodiment of my invention, the second position of certain of the ground engaging wheels being indicated by dotted lines, the body of the vehicle being omitted, Figure 2 is a view in side elevation of the structure as illustrated in Figure 1, a coacting chassis or body being shown in applied position, Figure 3 is a view in rear elevation of the structure illustrated in Figure 2, certain of the parts being omitted for clarity in disclosure, Figure 4 is a fragmentary view in top plan illustrating a further embodiment of my invention, and Figure 5 is a fragmentary view in top plan illustrating another embodiment of my invention.

As particularly illustrated in Figures 1, 2 and 3, C denotes a chassis or body having depending from each side member 1 at predetermined spaced points the brackets 2. Pivotally supported, as at 3, with the lower portion of each of the brackets 2, is an equalizing bar 4 substantially horizontally disposed at all times.

Underlying the forward end portion of the chassis or body C is a front axle 5 provided at its opposite end portions with the swinging spindles 6 of a conventional type and mounted on each of said spindles 6 is a front steering wheel 7. Associated with the spindles 6 are the rearwardly directed spindle arms 8 operatively connected by the steering rod 9 so that both of the wheels 7 will have lateral swinging movement in unison and in the same general direction as is well known. The desired lateral or steering movement is imparted to the wheels 7 in the well known manner upon proper operation of the steering wheel 10.

The front axle 5 is of a floating type and each end portion is suitably secured to the central portion of a semi-elliptical spring 11, one end of said spring being operatively engaged, as at 12, with the forward extremity of the adjacent side member 1 of the chassis or body C, while the opposite or inner end portion of the spring 11 is operatively engaged, as at 14, with the forward end portion of the adjacent equalizing bar 4.

Positioned substantially centrally between the forward pair of brackets 2 is the transversely disposed casing 15 in which are mounted in a conventional manner the driving axles 16 to each of which is fixed, in any desired manner, a drive wheel 17. The wheels 17 are adapted to be driven in a conventional manner by a suitable motor comprised in the vehicle structure.

The opposite end portions of the front axle 5 and the casing 15 are connected by the brace rods 18, each of said rods having a universal connection, as at 19, with the front axle 5 and the casing 15. These universal connections 19 compensate for the vibrations incident to travel and particularly compensate for any unequalities encountered in the surfaces over which the vehicle may travel. Each end portion of the casing 15 is secured to the central portion of a semielliptical spring 20 and the forward end portion of said spring 20 is operatively engaged, as at 21, with the rear end portion of the forward equalizing bar 4. The opposite or rear end portion of the spring 20 is operatively engaged, as at 22, with the forward end portion of the central or intermediate equalizing bar 4.

Positioned substantially midway between the intermediate and rear brackets 2 is a transversely disposed axle 24 and interposed between the axle 24 and the casing 15 is a brace and hitch member 25. As herein disclosed, the member 25 is substantially V-shape in form and having the apex portion in universal connection, as at 26, with the central portion of the casing 15, while the rear or free end portions of the member 25 are loosely coupled as at 27, to the axle 24. This particular mounting of the brace and hitch member 25 is also for the purpose to compensate for undue vibration or unevenness in the surface over which the vehicle is traveling.

Each end portion of the axle 24 is also provided with a swinging spindle 28 and on which is mounted a ground engaging wheel 46.

The spindles 28 are provided with the rearwardly directed spindle arms 29 operatively engaged by a steering rod 30, whereby the spindles 28 are caused to swing in unison and in the same general direction.

Each end portion of the axle 24 is secured to the central portion of a semielliptical spring 31, and the forward end portion of the spring extending above the rear portion of the intermediate or central equalizing bar 4. The forward end portion of the spring 31 and the rear end portion of the central or intermediate equalizing bar 4 are operatively connected by a flexible member 32 herein disclosed as a chain. The rear portion of the spring 31 terminates above the forward end portion of the equalizing bar 4, carried by the rear bracket 2, and said forward end portion of said bar 4 and the rear portion of the spring 31 are connected by the flexible member 33 also herein disclosed as a chain.

34 denotes a rear axle having each end portion operatively engaged with a semielliptical spring 35. The forward end portion of the spring 35 overlies the rear portion of the adjacent equalizing bar 4 and operatively engaged therewith by the flexible member 36, preferably a chain. The rear end portion of the spring 35 has depending therefrom a chain or other flexible connection 37 which is operatively engaged with the free end portion of a semielliptical spring 38 extending transversely of the rear portion of the chassis or body C, the central portion of said spring 38 being secured, as at 39, to said chassis or body C. The opposite end portions of the rear axle 34 are provided with the swinging spindles 39 on which are mounted the ground engaging wheels 40. The spindles 39 are provided with the rearwardly directed spindle arms 41 operatively connected by a steering rod 42 whereby said wheels 40 have lateral swinging movement in unison and in the same general direction. It is to be particularly noted that the distance of each of the spindle arms 41 from the mounting of the adjacent spindle 39 and the connection of said arm with the steering rod 42 is less than the similar distance in each of the arms 29 hereinbefore referred to, the purpose of which to be hereinafter explained.

Connected, as at 43, to each end portion of the casing 15 and preferably by a universal joint, is a rearwardly directed elongated member or rod 44. Each of these rods 44 is pivotally connected, as at 45, with the outer end portions of the spindles 29 and 41, the pivotal connections being also common to the steering rod 30 or 42. The rods 44, as the forward portion of the vehicle makes a lateral turn, are reversely moved endwise during the steering or turning movement of the casing 15. These movements of the rods 44 result in the wheels 40 and 45 having unitary lateral swinging movement in a direction reverse to the turning movement of the forward end portion of the vehicle so that the rear portion of the vehicle will have opposite travel in a direction away from that in which the turn is made so that as the vehicle in its entirety completes a turn the rear portion of the vehicle will travel in substantially the same path as the forward end portion of the vehicle. This turning movement of the rear portion of the vehicle is further facilitated by the differences in the lengths of the spindle arms 29 and 41 as hereinbefore specified, as the rear wheels 40 will be swung on a greater arc than the wheels 46.

In practice the wheel base of my vehicle will be materially long and for this reason it is also of importance that the rear portion of the body or chassis C be capable of lateral swinging movement and this desired movement is permitted by the flexible connections 32, 36 and 37.

Connecting the opposite end portions of the axles 24 and 34 are the brace or hitch bars 47, the extremities of said bars 47 being preferably connected to the axles 24 and 34 by the universal joints 48 in order to compensate for the vibrations incident to travel.

In Figure 4 I illustrate an embodiment of my invention whereby the same may be employed in connection with a draft animal. In this embodiment of my invention, the shafts 49 are each vertically pivotally connected with the rigid front axle 5' for lateral swinging movement and one of the shafts 49 is provided with a rearwardly disposed extension 50 which is operatively connected with the spindle arm 8' by the rod 51. As the shafts 49 are swung laterally, the extension 50 together with the rod 51 will swing the spindle arms 8' to effect the desired movement of the spindles 6'.

In the embodiment of my invention shown in Figure 5, the vehicle is also adapted to be drawn by a draft animal, and the front axle 5ª is adapted to swing about a central axis as indicated at 52. Secured to the opposite end portions of the axle 5ª are the rearwardly directed rods 53. Each of these rods 53 is adapted to be connected with the spindle arms in the same manner as has hereinbefore been set forth with respect to the rods 44.

From the foregoing description it is thought to be obvious that a vehicle constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A vehicle comprising a running gear including a plurality of axles, said axles including an intermediate axle, wheels carried by said intermediate axle, the axles in advance and to the rear of the intermediate axle having swinging spindles, wheels mounted on the spindles, means for moving the spindles of each of said last named axles in unison, steering means associated with one of said last named axles, an operative connection between the intermediate axle and each of the spindles of the remainder of the last named axles whereby said spindles are automatically moved by the intermediate axle during a turning travel of the vehicle, and a body supported by the axles, the portion of the body rearwardly of the intermediate axle being laterally movable with respect to the remainder of the last named axles.

2. A vehicle comprising a chassis, a driving axle arranged beneath the chassis intermediate the ends thereof and having the usual ground engaging wheels, a supporting and steering axle arranged beneath the chassis forwardly of the driving axle and having the usual manually controlled steering wheels, a supporting axle arranged beneath the chassis rearwardly of the driving axle and bearing ground engaging steering wheels connected for movement in unison, the last named axle permitting limited transverse shifting of the chassis thereover, and means connecting the driving axle and the last named steering wheels and becoming operative upon shifting of the chassis for turning the wheels of the last named axle in the direction of shift of the chassis.

3. A vehicle comprising a chassis, a running gear including a plurality of axles for supporting the chassis, said axles including a drive and a steering axle secured to the chassis, and other axles arranged rearwardly of the driving axle and permitting lateral movement of the chassis with relation thereto, wheels carried by all of said axles, the wheels of said steering axle and the axles rearwardly of the driving axle being provided with swinging spindles upon which the wheels are mounted, steering mechanism associated with the wheels of the steering axle, and means connecting the driving axle and the spindles of the axles rearwardly thereof whereby said spindles are automatically moved upon lateral movement of the chassis with relation to the last named axles.

4. A vehicle comprising a chassis, a running gear including a plurality of axles for supporting the chassis, said axles including a drive and a steering axle secured to the chassis, and other axles arranged rearwardly of the driving axle and permitting lateral movement of the chassis with relation thereto, wheels carried by all of said axles, the wheels of said steering axle and the axles rearwardly of the driving axle being provided with swinging spindles upon which the wheels are mounted, steering mechanism associated with the wheels of the steering axle, and means connecting the driving axle and the spindles of the axles rearwardly thereof whereby said spindles are automatically moved upon lateral movement of the chassis with relation to the last named axles, the turning movement imparted to the spindles being such that the wheels are turned in the direction of lateral shift of the chassis.

In testimony whereof I hereunto affix my signature.

MARTIN J. FURLONG.